LOGIC MODULE USING MAGNETIC SWITCHES

Filed Jan. 12, 1962 3 Sheets-Sheet 1

INVENTOR.
WYMAN L. DEEG
BY
Mason, Kolehmainen,
Rathburn and Wyss
ATTORNEYS

LOGIC MODULE USING MAGNETIC SWITCHES

Filed Jan. 12, 1962

INVENTOR.
WYMAN L. DEEG
BY
Mason, Kolehmainen, Rathburn and Wyss
ATTORNEYS.

June 14, 1966 W. L. DEEG 3,256,425

LOGIC MODULE USING MAGNETIC SWITCHES

Filed Jan. 12, 1962 3 Sheets-Sheet 3

INVENTOR.
WYMAN L. DEEG
BY
Mason, Kolehmainen, Rathburn and Wyss
ATTORNEYS

United States Patent Office 3,256,425
Patented June 14, 1966

3,256,425

LOGIC MODULE USING MAGNETIC SWITCHES

Wyman L. Deeg, Glenview, Ill., assignor to C. P. Clare & Company, Chicago, Ill., a corporation of Delaware Filed Jan. 12, 1962, Ser. No. 165,880
21 Claims. (Cl. 235—176)

This invention relates to logic circuits and, more particularly, to a logic module in which magnetic flux is to perform logic functions.

Industrial control, communication, and data handling systems perform many different types of operations on control and intelligence data or signals. During the evolution of these systems to the somewhat complex arrangements now used, the circuits for performing the various commonly required operations, such as data translation and storage and the performance of arithmetic operations, have been reduced, at least in concept, to a relatively few basic circuits capable of supplying many different types of logical functions. By the varied and repeated use of the basic circuit configurations, it is possible to quickly and efficiently design the present complex networks. Some of the basic circuits commonly encountered are "AND" and "OR" circuits, bit storage units, and binary adders.

In the early data handling systems, the necessary logical functions were performed largely by the use of electromagnetically operated relays in which the operated or released condition of the relay could be used to denote the presence or absence of a data bit and the plurality of contacts controlled by the relays could be interconnected to perform "AND" and "OR" logic functions. As an example, two series connected contacts on two relays provide a simple "AND" circuit, while the parallel connection of these contacts provide a basic "OR" circuit. However, the use of the usual telephone type relay in logic circuits is not desirable in many applications because of their relatively low operating speed, the rather extensive wiring to the contacts required to provide certain logic functions, and the need for a relatively large number of individual relays to perform even simple logic functions.

The disadvantages stemming from the slow operating speed of the relay led to the extensive adoption of controlled conduction devices, such as vacuum tubes and solid state devices, in logic circuits. These components possess relatively high switching speeds and offer advantages in size and power consumption. However, each controlled conduction device is the equivalent of only a single pair of contact springs on a relay, and the complexity of present systems means that an extremely large number of these components is required. This has the effect of increasing the cost of the system not only from the viewpoint of the cost of the components but also from the viewpoint of the labor cost involved in the many assembling and checking operations required.

It has been possible to reduce the cost of fabricating complex systems of the type using logic circuits by providing an arrangement of frequently used components, such as diodes, transistors, resistors, etc., in a modular form for use as a common "building block." These arrangements are such that the different desired logic circuits can be obtained merely by changing the external connections to the components in the module. In this manner, identical modules can be manufactured in large quantities and then easily converted into circuits capable of performing different logic functions.

Even with the use of logic modules, the cost of the solid state components remains relatively high, and there are many applications in which the necessary switching speeds are lower than those obtained in solid state devices and higher than those possessed by conventional relays. However, the use of a lower speed logic module to obtain lower component and labor costs should not result in either decreased reliability and life or increased power consumption.

Accordingly, one object of the present invention is to provide a new and improved logic module.

Another object is to provide the logic module in which magnetic flux is used to perform logic functions.

A further object is to provide a new and improved logic module possessing an intermediate switching speed and being capable of low cost fabrication with a minimum number of component parts.

A further object is to provide a logic module including a plurality of pairs of magnetic and electrically conductive members that are moved into and out of engagement by combining control and input fluxes in the members in accordance with the logic function to be performed.

A further object is to provide a logic module including a plurality of sealed magnetic switch units each of which is provided with an individual bias winding and all of which are linked by a number of common windings equal to the number of logic input signals.

A further object is to provide a logic module using sealed magnetic contacts that is capable of performing binary addition, binary subtraction signal sequence detection and signal translation operations, among others.

A further object is to provide a method of performing logic operations by controlling the generation of control and logic input signal fluxes in a plurality of relatively movable magnetic members.

In accordance with these and many other objects, a logic module embodying the present invention includes a number M of sealed switch units each including a sealed dielectric envelope in which are mounted a pair of magnetic and electrically conductive magnetic elements or members that are movable into engagement to complete an electric circuit therethrough in response to the application of a single unit of flux. All of the sealed switch units are disposed within N common logic input windings where N is a number equal to the number of logic signals and greater in value than 2. In addition, at least $M-1$ of the sealed switch units are each provided with an individual bias winding. The flux generated by the bias winding links the magnetic contacts in only the sealed switch unit to which the bias winding is individual, as contrasted with the flux generated by the input windings that links the magnetic elements in all of the sealed switch units.

This logic module can perform a variety of different logic functions by controlling the connections between the magnetic contacts in the sealed switch units, by controlling the energization of the bias windings, and by controlling the energization of the common input windings. More specifically, the magnetic contacts are connected into a circuit configuration in dependence on the logic function to be performed and the bias windings are continuously energized to bias the switch capsules individual thereto with flux fields of either polarity that are whole number multiples of the single flux unit required to operate the switch capsule. In some applications, the whole number multiple of the single flux unit is supplemented by a half flux unit. The common or input windings, which are equal in number to the number of logic input signals, are individually controlled by the input logic signals to provide single units of flux of either polarity. In some applications, one or more of the bias windings are connected to one or more of the common input windings. The logic module with the continuously energized bias windings and the intermittently energized common input windings perform logic operations by combining the different units of bias and input flux in the different magnetic contact members of the switch capsules to provide a logic module of an intermediate switching speed that possesses great reliability and can be manufactured at a reduced cost with a minimum number of components.

Many other objects and advantages of the present invention will become apparent from considering the following detailed description in conjunction with the drawings, in which.

Figures 1, 2, 3, 4:
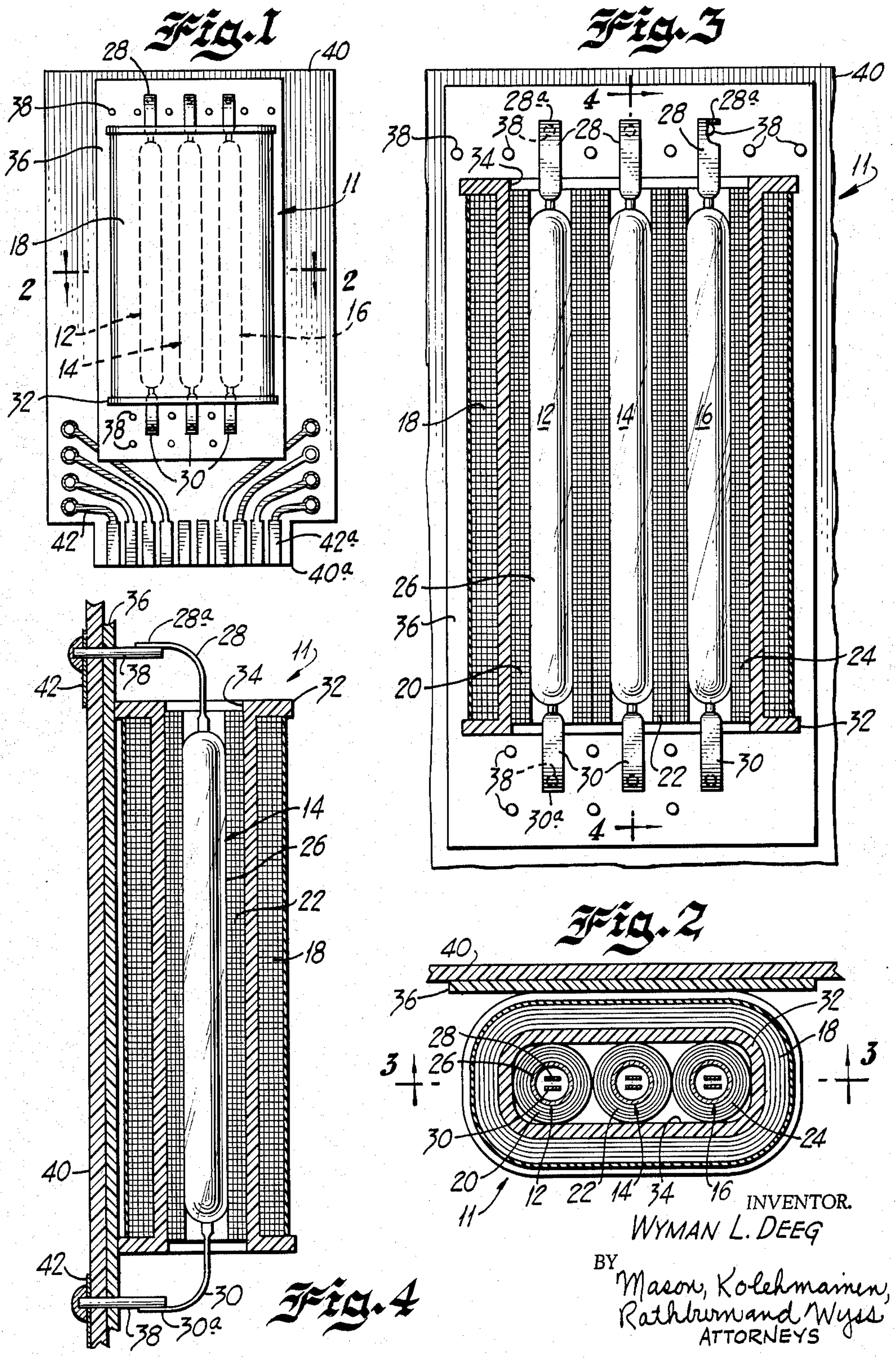
FIG. 1 is a plan view of the physical construction of a logic module embodying the present invention.
FIG. 2 is an enlarged sectional view taken along line 2—2 in FIG. 1.
FIG. 3 is a sectional view taken along line 3—3 in FIG. 2.
FIG. 4 is a sectional view taken along line 4—4 in FIG. 3.

Referring now more specifically to FIGS. 1–4 of the drawings, therein is illustrated a logic module, indicated generally as 11, which embodies the present invention and which includes a number M of sealed switch units disposed within a common input operating winding means having a number N of separate windings equal to the number of logic input signals. The sealed switch units are provided with at least $M-1$ individual bias windings. The logic module 11 combines the fluxes individually and commonly applied to the magnetic switching elements in the sealed switching units to perform various logic functions.

In the logic module 11 illustrated in FIGS. 1–4, three sealed switch units 12, 14, and 16 are disposed within the axial opening in a common input winding means 18 which includes three separate windings adapted to receive three discrete logic input signals. Each of the individual sealed switch units 12, 14 and 16 includes a pair of magnetic and electrically conductive elements which are moved into engagement in response to the application of a single unit of flux thereto and which are capable of being held in engagement in response to the application of substantially one-half of a single unit of flux. Each of the sealed switch units 12, 14 and 16 is provided with an individual bias winding 20, 22 and 24, respectively, that provides a flux field linking only the single switch unit to which the bias winding is individual. The three individual logic input windings in the winding means 18, when energized, each provide a single unit of flux of either polarity linking all of the three sealed switch units 12, 14 and 16. The bias windings 20, 22 and 24, when energized, provide whole number multiples of single flux units of either polarity linking only the one of the switch units 12, 14 or 16 to which the bias winding is individual. In certain applications, the windings 20, 22 and 24 provide a half unit of flux added to a whole number multiple of the single flux unit. By combining the flux provided by the input winding means 18 and the various bias windings 20, 22 and 24 in the magnetic elements of the sealed switch units 12, 14 and 16 and by variously connecting the contacts provided by these magnetic elements, the logic module 11 can perform any one of a variety of different logic functions.

Referring now more specifically to the construction of the switch elements 12, 14 and 16, each of these units can comprise a "dry type" or "wetted" sealed switch unit of a well known construction. The illustrated switch unit includes an elongated dielectric or glass envelope or housing 26 from the opposite ends of which a pair of magnetic and electrically conductive terminals or elements 28 and 30 extend. The inner ends of the magnetic elements 28 and 30 overlap and are normally maintained in a spaced relation (FIG. 2). When a single unit of flux of either polarity is applied to the switch units 12, 14 and 16, the overlapping portions of the magnetic elements 28 and 30 are moved into engagement to complete an electrically conductive circuit between these terminals. The sealed switch units 12, 14 and 16 also have the characteristic that once the magnetic elements 28 and 30 have been moved into engagement, they can be retained in this engaged position by the application of one-half of a single operating flux unit of either polarity.

The winding means 18 is carried on a coil bobbin 32 defining an axially extending opening 34 in which the sealed switch units 12, 14 and 16 and the bias windings 20, 22 and 24 individual thereto are disposed. As indicated above, the winding 18 includes a number N of separate windings equal to the number of logic inputs. The winding means 18 is a distributed winding in which each of the three individual coils or windings therein provides a flux substantially equally linking the magnetic elements 28 and 30 in all three of the switch units 12, 14 and 16. The individual windings in the winding means 18 provides a single unit of flux of either polarity.

Each of the bias windings 20, 22 and 24 is mounted or carried on the dielectric envelope 26 of one of the sealed switch units 12, 14 and 16 extending substantially along the entire length thereof. Each of the bias windings 20, 22 and 24 generates a flux field that links the two magnetic elements 28 and 30 in only the one of the switch units 12, 14 and 16 to which the bias winding is individual. The bias windings 20, 22 and 24 are adapted to provide whole number multiples of single flux units of either polarity that are individually combined with the flux fields applied in common to all of the switches by the energization of the separate windings in the winding means 18. In certain applications, the bias windings 20, 22 and 24 can provide a half unit of flux.

The physical support for the logic module 11 and means for extending electrical connections to the switch units 12, 14 and 16 and the windings 18, 20 and 22 and 24 can be provided in any desired manner. However, the logic module 11 can conveniently be mounted on a dielectric panel 36 having a plurality of terminal pins 38 carried thereon. The magnetic elements or terminals 28 and 30 can be provided with bent end portions 28*a* and 30*a* that are secured, as by soldering, to certain of the terminal pins 38, and the leads to the plurality of bias and input windings can be connected to others of the terminal pins 38. Thus, the logic module 11 can be formed as a complete unit carried on the dielectric panel 36.

When the logic module 11 is to be used to provide a desired logic function, the dielectric panel 36 can be mounted on a second dielectric panel 40 carrying a printed circuit pattern thereon including a plurality of individual conductive segments 42. The panel 40 can be provided with apertures extending through or disposed adjacent the conductive segments 42 for receiving the free ends of the terminal pins 38. Thus, the panel 36 carrying the logic module 11 can be mounted on the panel 40 by inserting the pins 38 into the openings and by connecting the free ends of the terminal pins 38 to the conductive segments 42, as by soldering. The conductive segments 42, which can be provided on one or both surfaces of the panel 40, include end portions 42*a* (FIG. 1) which extend to an end portion 40*a* of the panel to provide a male connector element. This male connector can be inserted into a female connector to establish connections to and to support the assembled panels 36 and 40 and the logic module 11 mounted thereon. The connections between the switch units 12, 14 and 16 and the connections to the windings 18, 20, 22 and 24 can be varied to provide different logic functions either by providing different circuit patterns on different panels 40 or by providing different external circuit arrangements connected to the female connector.

Figure 5:
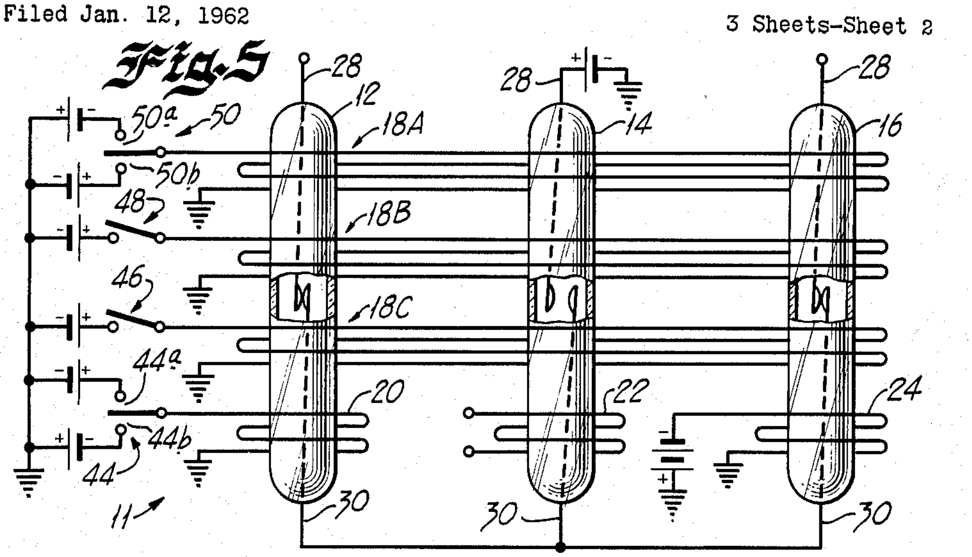
FIG. 5 is a schematic diagram of the logic module illustrating its use as a binary adder or a binary subtractor.

To illustrate the numerous logic functions that can be performed by the logic module 11, FIG. 5 of the drawings illustrates the use of the logic module 11 as a binary adder and a binary subtracter. When the logic module 11 is used as a binary adder, three of the magnetic elements or terminals, such as the terminals 30, are connected in common, and a potential source is connected to the terminal 28 of one of the switch units, such as the switch unit 14. The bias winding 24 individual to the capsule 16 is continuously energized to provide a negative double unit of flux so that the contacts 28 and 30 in the capsule 16 are normally maintained in a closed condition. The bias winding 20 individual to the switch unit 12 is continuously energized to provide a negative single unit of flux by operating a switch 44 to close a pair of contacts 44*b*. The negative single unit of flux supplied to the capsule 12 closes the magnetic contacts 28 and 30 in this unit. However, the terminals 28 in the switch units 12 and 16 are not energized because of the open condition of the contacts 28 and 30 in the switch capsule 14. With this circuit arrangement, the terminal 28 of the switch capsule 16 will provide an output signal representing a data bit and the terminal 28 of the switch capsule 12 will provide a carry signal.

A binary adder unit requires three inputs representing an augend, an addend, and a carry, and these three logic signal inputs are individually applied to the three separate windings, indentified as 18A, 18B and 18C, in the winding means 18. The winding 18A is energized to provide a positively directed single flux unit representing an augend by operating a switch 50 to close a pair of normally open contacts 50*b*. The winding 18B is energized to provide a single positively directed unit of flux representing an addend input by closing a switch 48. The winding 18C is energized to provide a positively directed single unit of flux representing a carry condition by closing a switch 46. By selectively combining the three single and positively directed units of flux representing carry, addend and augend information with the negatively directed continuous bias applied to the capsule 12 and the negatively directed double unit of bias continuously applied to the capsule 16, the logic module 11 performs binary addition.

The operation of the logic module 11 as a full binary adder is illustrated by the following table which sets forth the different output conditions established by the module 11 is response to different combinations of input conditions. The presence of an "X" in one of the rows representing the windings 18A, 18B and 18C indicates that the corresponding winding is in an energized condition and the presence of an "O" indicates that the designated winding is not energized. In the two rows representing a sum bit and a carry bit, the presence of a "1" represents a signal output and a "0" represents the absence of a signal output.

| | | | | | | | | |
|---|---|---|---|---|---|---|---|---|
| Augend Winding 18A | O | X | O | O | X | X | O | X |
| Addend Winding 18B | O | O | X | O | X | O | X | X |
| Carry Winding 18C | O | O | O | X | O | X | X | X |
| Sum Bit at Switch 16 | 0 | 1 | 1 | 1 | 0 | 0 | 0 | 1 |
| Carry Bit at Switch 12 | 0 | 0 | 0 | 0 | 1 | 1 | 1 | 1 |

In operation, the application of an addend signal to the module 11 by closing the switch 48 energizes the winding 18B so that a single positive flux unit links the magnetic elements 28 and 30 in all three of the capsules 12, 14 and 16. The switch capsule 14 is not biased, and the single unit of input flux closes the contacts 28 and 30 so that the potential supplied to the contact 28 of the capsule 14 is applied to the terminals 30 to both of the switch capsules 12 and 14. In the capsule 12, the single positive unit of flux provided by the winding 18B combines with the single unit of negative bias flux supplied by the winding 20 so that the contacts 28 and 30 in the capsule 12 are opened. Thus, the terminal or contact 28 of the switch unit 12 does not provide a potential representing a carry condition. In the capsule 16, the single positive unit of flux provided by the winding 18B is combined with the two negative units of flux provided by the bias winding 24 and results in a single unit of negative bias applied to the magnetic contacts 28 and 30. Thus, these contacts remain in engagement and the potential supplied by the closed contacts 28 and 30 in the switch capsule 14 is forwarded to the output terminal 28 of the capsule 16 to provide a sum bit. The logic module 11 is restored to its normal condition by opening the switch 48 to terminate the energization of the winding 18B. Similarly, if either an augend input or a carry input is present, as represented by the closure of the contacts 50*b* or 46, one of the windings 18A or 18C is energized to provide a single positive unit of flux linking all of the switch units 12, 14 and 16. This controls the module 11 to supply a sum bit output signal at the contact or terminal 28 of the switch 16 in the manner described above.

A full binary adder unit must also supply a carry bit output and no sum bit output when any pair of augend, addend, and carry inputs is present. Assuming that an augend input is supplied, the closed contacts 50*b* energize the winding 18*a* to apply a single positive unit of flux to the magnetic elements 28 and 30 in all of the switch units 12, 14 and 16. If an addend signal is received, the closed switch 48 energizes the winding 18B to apply a second positive unit of flux to all of the switches 12, 14 and 16. This results in the application of two positive units of flux to the magnetic elements 28 and 30 in all three of the switch units 12, 14 and 16.

The positive double unit of flux is combined in the switch unit 16 with the negative double unit of flux supplied by the bias winding 24 to place the contacts 28 and 30 in an open condition. This prevents the application of a signal to the output terminal 28 of the capsule 16 representing a sum bit. The two positive flux units supplied to the magnetic elements 28 and 30 in the switch unit 12 overcome the single negative unit of flux provided by the bias winding 20 so that the contacts 28 and 30 in this switch capsule are held in engaged position by the resultant single positive flux unit. The two positive flux units applied to the magnetic elements 28 and 30 in the switch unit 14 move the contacts 28 and 30 into engagement so that the potential connected to the contact 28 in the switch unit 14 is forward through the closed contacts 28 and 30 in the switch 12 to energize the output contact or terminal 28 in this unit representing a carry bit. Similarly, the application of any two logic inputs to the module 11 results in the presence of a carry bit signal at the contact 28 of the unit 12 and the absence of a sum bit signal at the terminal 28 of the switch 16. In this manner, the continuous bias fluxes supplies by the bias windings 20 and 24 are combined with the fluxes resulting from the energization of the winding means 18 by the logic input signals so that the logic module 11 operates to a full binary adder.

When the logical module 11 shown in FIG. 5 is used as a full binary subtracter, the capsule 16 is again provided with a continuous negative bias of two flux units by the winding 24 to hold the contacts 28 and 30 closed, and the magnetic contact or terminal 28 in this switch capsule is used to provide a difference bit output. The switch 44 is operated to open the contacts 44*b* and to close the contacts 44*a* so that the bias winding 20 generates a positive single unit of bias flux to normally hold the magnetic contacts 28 and 30 in the switch unit 12 in a closed condition. The contact 28 of the unit 12 provides a borrow output. The switch capsule 14 is not biased.

In binary subtraction, three inputs are provided representing a minuend, a subtrahend, and a borrow condition. The minuend is represented by a single unit of flux of negative polarity provided by operating the switch 50 to close the contacts 50*a*. This energizes the winding 18A to provide a negative single unit of flux linking all of the switch units 12, 14 and 16. The switch 48 can be closed to energize the winding 18B to provide a positive single unit of flux representing the subtrahend, and the switch 46 can be closed to energize the winding 18C to provide a positive single unit of flux representing a borrow condition.

The table set forth below lists the various output conditions for the logic module 11 when used as a full binary subtracter with different combinations of input signals. In the table, the presence of an "X" in one of the rows corresponding to one of the windings 18A, 18B, or 18C indicates the energization of the designated winding, and the presence of an "O" indicates that the designated winding is not energized. In the two rows representing the difference bit and the borrow bit, a "1" represents the presence of an output and a "0" represents the absence of an output.

| | | | | | | | | |
|---|---|---|---|---|---|---|---|---|
| Minuend Winding 18A | O | X | O | O | X | X | O | X |
| Subtrahend Winding 18B | O | O | X | O | X | O | X | X |
| Borrow Winding 18C | O | O | O | X | O | X | X | X |
| Difference Bit at Switch 16 | 0 | 1 | 1 | 1 | 0 | 0 | 0 | 1 |
| Borrow Bit at Switch 12 | 0 | 0 | 1 | 1 | 0 | 0 | 1 | 1 |

As an example of the operation of the logic module 11 as a full binary substracter, the second column in the table above indicates that the presence of a minuend causes the module 11 to provide a difference bit output only. The minuend is represented by the closure of the contacts 50*a* to energize the winding 18A so that a negative single flux unit is applied to the magnetic elements 28 and 30 in all three of the switch units 12, 14, and 16. In the switch unit 12, the negative single unit of flux from the winding 18A is combined with the positive single unit of flux provided by the bias winding 20, and the contacts 28 and 30 in this unit move to an open condition. In the switch unit 16, the single unit of negative flux from the common input winding 18A is combined with the double unit of negative flux supplied by the bias winding 24 to provide a resultant flux field of three times unit strength acting on the magnetic elements 28 and 30. Thus, these contacts remain in a closed condition. The single negative unit of flux supplied by the common winding 18A acts on the magnetic elements 28 and 30 in the unbiased switch unit 14 to close these contacts so that a potential is applied to the output contact 28 of the switch capsule 16 representing a difference bit.

As a further example, the fourth column of the table above indicates that the presence of only a borrow signal should result in the generation of a difference bit and a borrow bit. The borrow signal is provided by closing the switch 46 to energize the winding 18C so that a positive single unit of flux is generated in the magnetic elements 28 and 30 in all three of the switch capsules 12, 14, 16. This single positive unit of flux is combined with the single positive unit of flux provided by the bias winding 20 to maintain the contacts 28 and 30 in the switch unit 12 in a closed condition. In the switch unit 16, the single positive unit of flux provided by the energized winding 18C is combined with the double unit of flux of negative polarity provided by the bias winding 24 to provide a resultant single unit of negative flux which maintains the contacts 28 and 30 in their closed condition. Thus, both of the output switch units 12 and 16 are maintained in a closed condition. The single positive flux unit provided by the winding 18C closes the contacts 28 and 30 in the unbiased switch unit 14 so that a potential is applied to the output contacts 28 in both of the units 12 and 16 representing both a borrow bit and a difference bit.

The remaining operations of the logic module 11 as a full binary subtracter when the different input conditions shown in the above table are established are obvious in view of the preceding detailed description.

Figure 6:
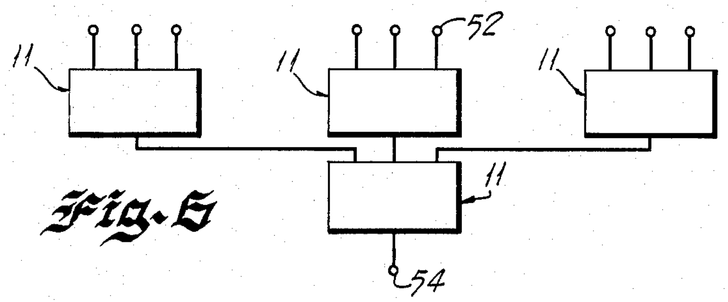
FIG. 6 is a schematic diagram illustrating the manner in which four of the logic modules can be used as a signal translator.
Figure 7:
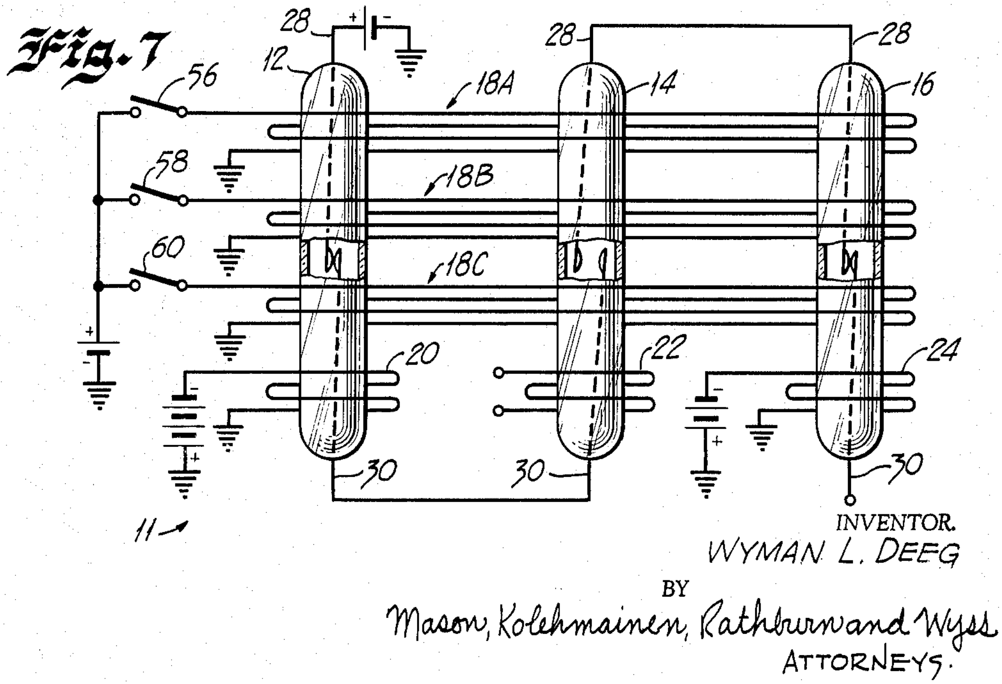
FIG. 7 is a schematic diagram illustrating one of the logic modules used in the translating circuit shown in FIG. 6.

FIGS. 6 and 7 of the drawings illustrate one use of four of the logic modules 11 as a signal translating network that provides an output signal when only one of nine possible input circuits is energized. Three of the logic modules 11 are each provided with three input terminals 52 to which can be applied one of nine different input signals. The output of each of the three input modules 11 is applied to one of three inputs to the fourth module 11. An output terminal 54 from the fourth or output logic module 11 is energized only when one of the nine input terminals 52 is energized.

FIG. 7 of the drawings provides a schematic diagram of the four logic modules 11 used in the translating network shown in FIG. 6. The bias winding 20 for the switch unit 12 is continuously energized to provide a negative field of three flux units so that the contacts 28 and 30 in the capsule 12 are normally maintained in closed condition. The switch capsule 14 is not biased. The bias winding 24 for the switch unit 16 is continuously energized to provide a negative field of two flux units so that the contacts 28 and 30 in the switch unit 16 are normally maintained in a closed condition. A potential source is connected to the magnetic contact or terminal 28 of the switch unit 12, and the remaining contacts or terminals of the units 12, 14, and 16 are connected in series so that an output signal is provided at the magnetic contact 30 of the switch unit 16. The potential source connected to the magnetic contact 28 in the switch unit 12 is applied to the magnetic element 30 of the switch unit 16 when an input is supplied to only a single one of the three windings 18A, 18B, and 18C in the winding means 18.

More specifically, these three windings are individually energized under the control of three switches 56, 58 and 60, representing signals applied to the input terminals 52, to provide positive single units of flux to all three of the switch units 12, 14, and 16. When any single one of the switches 56, 58 or 60 is closed, the positive single unit of flux provided by the energized winding 18A or 18B or 18C closes the contacts 28 and 30 in the unbiased switch unit 14 to complete a conductive circuit through all three of the switch units 12, 14 and 16. A single positive unit of flux is not sufficient to overcome the double unit negative bias applied to the switch unit 16 or the triple unit negative bias applied to the switch unit 12. However, if two or three of the switches 56, 58 and 60 are closed to provide either a positive double unit of flux or a positive triple unit of flux, one of the sets of contacts 28 and 30 in one of the switches 12 or 16 is operated to an opened condition. This interrupts the continuity of the circuit between the potential source connected to the switch 12 and the output terminal connected to the switch 16.

Thus, each of the three input modules 11 connected to the input terminals 52 provides an output signal only when one of the input terminals 52 is energized. The three output terminals 30 in the three input modules 11 are connected to the three inputs of the fourth or output logic module 11. The output logic module 11 is identical to the circuit shown in FIG. 7. Thus, the output terminal 54 is connected to a potential source only when one of the three input logic modules 11 provides an output signal. Thus, the output terminal 54 is energized when an input signal is applied to only one of the input terminals 52.

Figure 8:
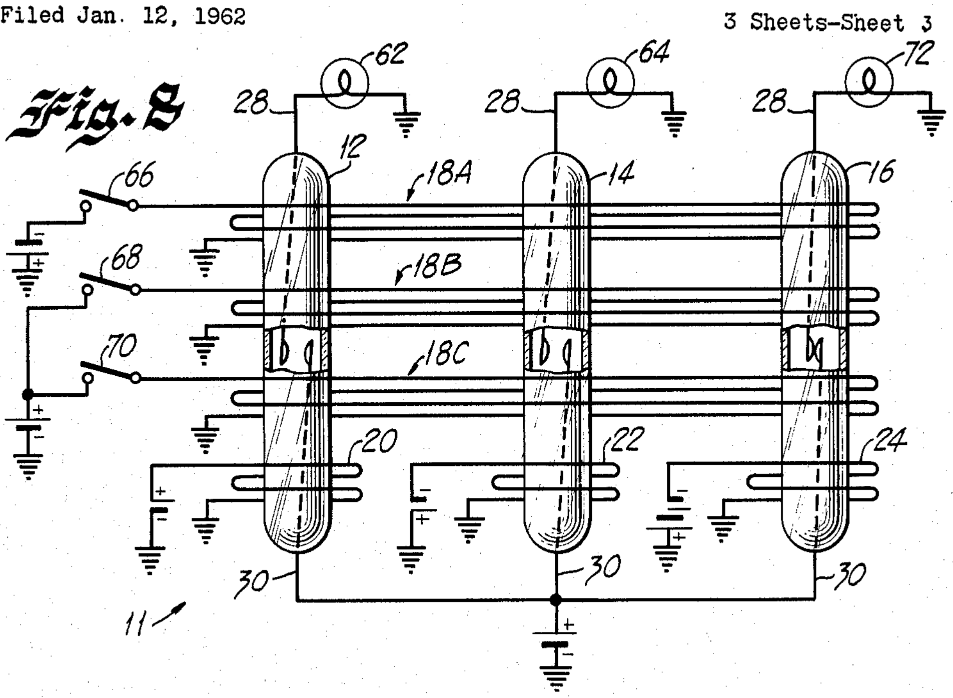
FIG. 8 is a schematic diagram illustrating the use of the logic module as a signal sequence detector.

FIG. 8 of the drawing illustrates one possible use of the logic module 11 as a signal sequence detector by which an indication is provided representing the order in which a plurality of signals are applied to the common input winding means 18. In the illustrated circuit shown in FIG. 8, the switch capsules 12 and 14 are used in combination to indicate the sequence in which pairs of three possible signals are applied to the winding means 18. The switch capsule 16 illustrates the manner in which a single switch unit can be used to indicate a signal sequence.

Referring now more specifically to the switch units 12 and 14, the bias winding 20 for the switch unit 12 is continuously energized to provide a half unit of positive flux, and the bias winding 22 is continuously energized to provide a negative half unit of flux. The contacts 30 in the two switch units 12 and 14 are connected to a potential source, and the contacts or magnetic elements 28 in these two switches are individually connected to a pair of lamps 62 and 64. In the normal condition of the switch units 12 and 14, the contacts 28 and 30 are not closed, and the lamps 62 and 64 are not illuminated. The input signals whose sequence is to be detected are supplied to the winding means 18 by three manually operated switches 66, 68 and 70. The switch 66, when closed, energizes the winding 18A to provide a first input signal and results in the generation of a single unit of negative flux. The closure of the switches 68 and 70 representing the other two input signals energizes the windings 18B and 18C, respectively, to generate single units of positive flux.

Assuming that a signal sequence is received in which the switch 66 is first closed and one of the switches 68 or 70 is subsequently closed to provide a two signal sequence including two of the three possible input signals, the closure of the switch 66 generates a negative single flux unit in both of the switch units 12 and 14. This negative unit is combined in the magnetic elements 28 and 30 in the switch unit 12 with the half unit of positive flux to provide a resultant flux of one-half of a flux unit poled in a negative direction. This is not sufficient to close the contacts 28 and 30. Thus, the lamp 62 is not illuminated. However, in the switch unit 14, the negative single flux unit from the winding 18A is added to the negative bias of one-half of a flux unit so that the contacts 28 and 30 in the switch unit 14 are closed to illuminate the lamp 64.

When one of the switches 68 or 70 is subsequently closed to generate a positive single unit flux field in one of the windings 18B or 18C, the resultant negative half flux unit in the switch 14 holds the contacts 28 and 30 in engagement so that the lamp 64 remains illuminated. The resulting half unit of positive flux in the contacts 28 and 30 in the switch 12 is not sufficient to close these contacts. Therefore, the illumination of the lamp 64 indicates that the negative signal provided by the closure of the switch 66 arrived prior to the positive signal provided by the closure of either of the switches 68 and 70. The contacts in the switch units 12 and 14 can be restored to their normal open condition by any suitable means, such as by momentarily removing the bias flux from these two switch units.

If one of the positive signals provided by closing one of the switches 68 or 70 is first applied to the logic module 11 followed by the negative signal supplied by the closure of the switch 66, the initial energization of one of windings 18B or 18C closes the contacts 28 and 30 in the switch unit 12 to illuminate the lamp 62. The contacts 28 and 30 in the switch 14 are not closed because the resultant flux in this switch unit is equal to only a half unit of positive flux. When the switch 66 is subsequently operated to produce a single unit of negative flux in both of the switch units 12 and 14, the contacts 28 and 30 in the switch unit 12 remain closed, and the contacts 28 and 30 in the switch unit 14 remain open due to the resultant half unit of negative flux in this switch. Thus, if one of the positive signals supplied by the closure of one of the switches 68 and 70 is supplied to the logic module 11 prior to the receipt of the negative signal provided by closing the switch 66, the lamp 62 is illuminated and the lamp 64 is not illuminated.

The logic module 11 provides a different indication when two of the positive signals are received in sequence. More specifically, when a first one of the switches 68 or 70 is closed to energize one of the windings 18B or 18C, the normally open contacts 28 and 30 in the switch unit 12 are closed because of the positive half unit of bias provided by the winding 20 so that the lamp 62 is illuminated. The contacts 28 and 30 in the switch 14 are not closed because the resultant field in the switch 14 is only a positive half unit of flux. However, when the second of the two switches 68 and 70 is closed, the contacts 28 and 30 in the switch unit 12 remain closed to illuminate the lamp 62, and the resultant flux in the switch unit 14 is increased to one and one-half positive units of flux so that the contacts 28 and 30 in the switch 14 close to illuminate the lamp 64. Thus, both of the lamps 62 and 64 are illuminated when the received signal sequence includes two positive signals. In this manner, the switch units 12 and 14 provide means for determining whether the sequence of signals supplied to the logic module 11 includes a positive signal followed by a negative signal, a negative signal followed by a positive signal, or two positive signals.

The single switch unit 16 is biased so that this single switch unit can be used to control the illumination of an indicator lamp 72 to provide an indication of the sequence in which signals are applied to the winding means 18. More specifically, the bias winding 24 is continuously energized to provide a unit and one-half of negative flux in the magnetic elements 28 and 30 in the sealed switch 16. This bias is sufficient to hold the contacts 28 and 30 in the switch 16 in a normally closed condition so that the lamp 72 is normally illuminated.

In a signal sequence in which the negative signal supplied by the closure of the switch 66 is supplied to the winding means 18 prior to one or both of the positive signals supplied by the switches 68 and 70, the lamp 72 remains in an illuminated condition at the termination of the three signal sequence. On the other hand, if both of the positive signals supplied by the closure of the contacts 68 and 70 are applied to the winding means 18 prior to the application of the negative signal resulting from the closure of the switch 66, the lamp 72 is not illuminated at the end of the three signal sequence.

More specifically, when a negative signal is applied to the winding means 18, as by closing the switch 66, prior to the closure of both of the switches 68 and 70, the resultant flux in the magnetic elements 28 and 30 can vary from only a negative half unit to a negative two and one-half units of flux because of the one and one-half unit negative flux continuously applied by the winding 24. This means that at all times, at least a half unit of negative flux is applied to the magnetic elements 28 and 30 to hold these elements in engagement to continuously energize the lamp 72. On the other hand, if both of the positive signals provided by closing the two switches 68 and 70 to energize the winding 18B and 18C are first applied to the logic module 11, the resultant flux in the magnetic elements 28 and 30 will swing from a negative one and one-half units of flux to a positive half-unit of flux. As the resultant flux swings through zero, the contacts 28 and 30 move out of engagement to terminate the illumination of the lamp 72. Thus, when the single negative unit of flux is subsequently supplied by closing the switch 66 to energize the winding 18A, the resultant flux can only swing from a positive half unit of flux field to a negative half unit of flux. This is not adequate to reclose the contacts 28 and 30. In this manner, the single switch unit 16 can be biased to permit only a single switch capsule to detect a signal sequence.

In certain applications, it is desirable to bias one or more of the sealed switch units 12, 14, and 16 under the control of an input signal rather than by providing a separate bias potential source. Two such arrangements are illustrated in FIGS. 9 and 10 of the drawings.

Figure 9:
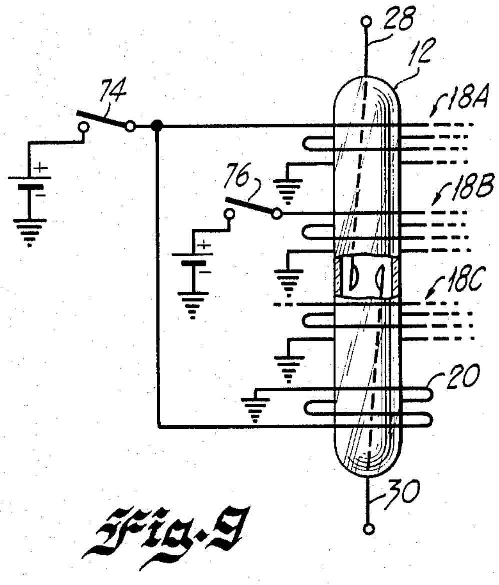
FIG. 9 is a schematic diagram illustrating one manner of interconnecting the common input and individual bias windings in the logic module.

In FIG. 9, the bias winding 20 for the switch capsule 12 is connected to the input winding 18A so that when a switch 74 is closed, the common input winding 18A and the bias winding 20 individual to the switch 12 are concurrently energized. The connections to the winding 20 can be such that the fields of the windings 18A and 20 are either additive or subtractive. If the fields are of equal strength and subtractive, no effective flux field is applied across the contacts 28 and 30, and the contacts remain in their normally open condition. The field generated by the winding 18A, however, can be effective to control the operation of the other two switches 14 and 16 in the logic module 11. The switch unit 12 can be closed, for instance, by operating a switch 76 to energize the winding 18B. The energization of this winding produces a single unit flux field linking the magnetic elements 28 and 30 that is effective to move these normally open contacts into their closed condition.

Figure 10:
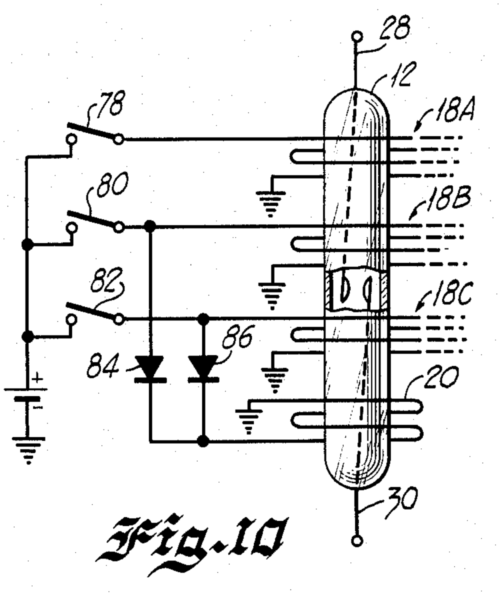
FIG. 10 is a schematic diagram illustrating another method of interconnecting the common input and individual bias windings.

FIG. 10 illustrates an alternative means for controlling the energization of the bias winding 20 for the sealed switch 12. Three switches 78, 80 and 82 are provided for individually energizing the three windings 18A, 18B and 18C in the common winding means 18. When the switch 78 is closed, a single flux unit is generated by the winding 18A linking the magnetic elements 28 and 30 in the switch 12 so that these elements move into engagement to complete a circuit. If either of the switches 80 or 82 is closed, the bias winding 20 is energized concurrently with one of the windings 18B and 18C through one of a pair of diodes 84 and 86 to generate a single unit flux field poled opposite to the field generated by the windings 18B and 18C. Thus, the magnetic elements 28 and 30 are not moved into engagement, and the flux field generated by the common input windings 18B and 18C can be effective in only the remaining switches 14 and 16 in the logic module 11.

The representative constructions described above illustrate a few of the logic functions that can be performed by the module 11. To further illustrate the universal applicability of the logic module 11 to perform logic functions, the following table lists the open and closed circuit conditions for a single one of the capsules, i.e., the switch unit 12, with varying combinations of bias fluxes and logic input signals.

| Winding Energized | Bias on Switch Unit 12 | | | | | | | | | | |
|---|---|---|---|---|---|---|---|---|---|---|---|
| | None | N1 | N2 | N3 | +.5 | +1 | −.5 | −1 | −1.5 | −2 | −3 |
| None | O | O | O | O | B | X | B | X | X | X | X |
| 18A(+) | X | O | X | X | X | X | O | O | X | X | X |
| 18A(−) | X | O | X | X | O | O | X | X | X | X | X |
| 18B(+) | X | X | X | O | X | X | O | O | X | X | X |
| 18A(+) and 18B(+) | X | X | X | X | X | X | X | X | O | O | X |
| 18A(−) and 18B(+) | O | X | X | X | B | X | B | X | X | X | X |
| 18B(+) and 18C(+) | X | X | X | X | X | X | X | X | O | O | X |
| 18A(−) and 18B(+) and 18C(+) | X | X | O | O | X | X | O | O | X | X | X |
| 18A(+) and 18B(+) and 18C(+) | X | X | X | X | X | X | X | X | X | X | O |

In the above table, the letter "O" indicates that the magnetic contacts or elements 28 and 30 are not in engagement, while the letter "X" indicates that the contacts are engaged to complete a conductive circuit. The letter "B" indicates a bistable condition in which the contacts remain in their previous open or closed condition. The three input windings 18A, 18B, and 18C each produce a single unit of flux of either positive or negative polarity, as indicated by the signs "+" and "−" immediately following the winding designation.

In the row of bias headings, the column entitled "N1" indicates tht the bias winding 20 for the switch unit 12 is connected as illustrated in FIG. 9 of the drawings so the energization of the winding 18A produces a positive single unit of flux and energizes the bias winding 20 to produce a negative single unit of flux. The column headed "N2" indicates that the bias winding 20 for the switch unit 12 is connected opposite to that shown in FIG. 9 so that the energization of the winding 18A produces a single positive unit of flux and also energizes the bias winding 20 to produce a positive single unit of flux. In the column headed "N3", the bias winding 20 for the switch unit 12 is connected as illustrated in FIG. 10 of the drawings so that the energization of one or both of the windings 18B and 18C to produce one or two units of flux of the same polarity energizes the bias winding 20 to produce a single unit of oppositely directed flux regardless of whether one or both of the windings 18B and 18C is energized. The numbers appearing on the other seven columns represent the polarity and magnitude of the bias applied to the switch unit 12 by the winding 20.

The table above does not list the conditions of the switch unit 12 when the winding 18C is energized alone to provide a single positive flux unit. However, the operation of the switch unit 12 for this condition is the same as the illustrated conditions for the switch when the winding 18B is energized to provide a single positive unit of flux. Similarly, the table does not illustrate the conditions of the switch unit 12 when the windings 18A and 18C are both energized to provide positive units of flux. The operations of the switch 12 with these input conditions are the same as those illustrated when the windings 18A and 18B are energized to provide positive units of flux.

The table above can be used to select the input and bias conditions necessary to perform a desired logic function. As an example, if it is desired to provide transmission through the logic module 11 when one of the three windings 18A, 18B or 18C is energized or when all three of the windings 18A, 18B, and 18C are energized, the transmission condition can be expressed in Boolean algebra as follows:

$$T = AB'C' + A'BC' + A'B'C + ABC$$

A consideration of the table above indicates that the required transmission conditions are satisfied by connecting the magnetic contacts 28 and 30 of an unbiased switch unit and a switch unit continuous biased with a negative field of two flux units in series. When the logic module 11 is connected in this manner, the energization of any single one of the windings 18A, 18B, and 18C to provide a positive unit of flux results in the establishment of a conductive path through both the unbiased switch unit and the switch unit biased with a negative field of two flux units. Similarly, when all three of the windings 18A, 18B, and 18C are energized, the contacts in both of the switch units are closed to complete a conductive path.

On the other hand, any other combination of energized windings 18A, 18B, and 18C does not result in the establishment of a conductive path.

Therefore, the logic module 11 provides a true logic module that can be used to provide a variety of logic functions. In the descriptions above, the signals for biasing and operating the module 11 are illustrated as being provided by manually operated switches. It is obvious that the energizing signals can be provided by various controlled conduction devices, such as solid state devices or vacuum tubes. The switch units in the logic module 11 operate in 3 milliseconds, which is considerably faster than the operating speeds of conventional relays, and provide switching reliability and life that exceeds both conventional relays and solid state devices. The cost of the logic module is substantially less than the cost of the conventional relay or solid state components required to produce the same logic functions. The common operating winding means 18 in the logic module 11 requires approximately 250 milliwatts of power for each input signal, and the bias windings 20, 22 and 24 each consume approximately 200 milliwatts of power for each unit of bias flux. Thus, the power requirements of the logic module 11 are no more than and usually are less than the power requirements of solid state devices performing the same logic functions.

Although the invention has been described with reference to a number of illustrative embodiments thereof, it should be understood that many other modifications and embodiments can be devised by those skilled in the art that fall within the spirit and scope of the principles of the present invention.

What is claimed as new and desired to be secured by Letters Patent of the United States is:

1. A logic module for use with a single input of N discrete signals where N is a number greater than two comprising M sealed switch units each comprising a sealed dielectric housing containing a pair of magnetic and electrically conductive elements movable into and out of engagement in response to an applied flux field, N separate control flux field generating means each controlled by one of said N discrete signals, each of said generating means producing a flux field linking the two magnetic elements in all of said M switch units that is sufficient to operate said elements, and at least $M-1$ bias flux field generating means each producing a flux field linking the pair of magnetic elements in only one of said sealed switch units.

2. The logic module set forth in claim 1 including circuit means connecting one of said bias flux field generating means to one of said control flux field generating means.

3. The logic module set forth in claim 1 including circuit means connecting one of said bias flux field generating means to one of said control flux field generating mens so that an input signal applied to a connected pair of control and bias flux field generating means results in the generation of oppositely directed flux fields in the elements of the switch unit individual to the bias flux field generating means.

4. The logic module set forth in claim 1 including a plurality of unidirectional conducting devices connecting a given one of said bias flux field generating means to more than one of said control flux field generating means.

5. A logic module for performing different logic operations with N input signals where N is a number greater than two comprising a plurality of pairs of magnetic and electrically conductive elements, each pair of elements being movable into engagement in response to the application of a single flux unit thereto, biasing means for continuously applying different whole number multiples of single flux units of selected polarities to selected ones of said pairs of magnetic elements in dependence on the type of logic operation to be performed, and operating means for operating said magnetic elements in dependence on the input signals to provide a logic output signal, said operating means including means for periodically applying different combinations of N single flux units of selected polarities to all of said pairs of magnetic elements in common in dependence on the type of logic operation to be performed.

6. A logic module for performing different logic operations with N input signals where N is a number greater than two comprising a plurality of sealed switch units each having a dielectric envelope including a pair of magnetic and electrically conductive elements, each pair of elements being movable into engagement in response to the application of a single flux unit thereto, biasing means for continuously applying different whole number multiples of single flux units of selected polarities to selected ones of said pairs of magnetic elements in dependence on the type of logic operation to be performed, said biasing means including an individual bias winding encircling the dielectric envelope of each of said selected ones of said switch units, and operating means for operating said magnetic elements in dependence on the input signals to provide a logic output signal, said operating means including N separate winding means each encircling the envelopes of all of the switch units for periodically applying different combinations of N single flux units of selected polarities to all of said switch units in common in dependence on the type of logic operation to be performed.

7. A logic module for use with N signals where N is a number greater than two comprising M sealed switch units each comprising a sealed dielectric housing containing a pair of magnetic and electrically conductive elements movable into and out of engagement in response to an applied flux field, N separate control flux generating means each having a winding encircling the housings of all of the switch units and being controlled by one of said N discrete signals, each of said generating means producing a flux field of a single flux unit strength linking the two magnetic elements in all of said M switch units that is sufficient to operate said elements, and control means for controlling the operation of different ones and combinations of said M sealed switch units in response to the application of signals to different ones and combinations of said control flux field generating means, said control means including separate bias winding means encircling the housings of individual ones of said switch units for applying continuous bias flux fields of selected polarities and strengths of whole number multiples of said single flux unit strength to at least $M-1$ of said sealed switch units.

8. A logic module for performing varied logic operations comprising three sealed switch units each operable by the application of a single unit of flux, first biasing means for continuously applying a whole number multiple of a single unit of flux to a first one of said switch units, second biasing means for continuously applying a whole number multiple of a single unit of flux to a second one of said sealed switch units, and operating means for operating said logic module, said operating means including three separate means for applying a single unit of flux to all three of said sealed switch units in common representing the logic input signals.

9. The logic module set forth in claim 8 in which each of the three sealed switch units includes a pair of contacts, said module also including circuit means interconnecting said contacts in a circuit configuration corresponding to the logic operation to be performed.

10. The logic module set forth in claim 8 in which each of the three sealed switch units includes a pair of contacts, said module also including circuit means connecting the contacts in said first and second switch units in parallel with each other and in series with the contacts in the third one of said sealed switch units.

11. A logic module for performing varied logic operations comprising three sealed switch units each having a sealed dielectric housing enclosing two magnetic contacts operable into engagement by the application of a single unit of flux, first bias winding means encircling the housing of only a first one of said switch units for continuously applying a whole number multiple of a single unit of flux to said first one of said switch units, second bias winding means encircling the housing of a second one of said switch units for continuously applying a whole number multiple of a single unit of flux to said second one of said sealed switch units, and operating means for operating said logic module, said operating means including three separate winding means each encircling all three of said switch units for applying a single unit of flux to all three of said sealed switch units in common representing logic input signals.

12. A logic module for binary addition comprising three sealed switch units each operable by the application of a single unit of flux, first biasing means for continuously applying a single unit of flux of a first polarity to a first one of said switch units, second biasing means for continuously applying a double unit of flux of said one polarity to a second one of said sealed switch units, and operating means for operating said logic module, said operating means including three separate means for applying a single unit of flux of a polarity opposite to said one polarity to all three of said sealed switch units in common representing augend, addend and carry information.

13. A logic module for binary subtraction comprising three sealed switch units each operable by the application of a single unit of flux, first biasing means for continuously applying a single unit of flux of a first polarity to a first one of said switch units, second biasing means for continuously applying a double unit of flux of a polarity opposite to said one polarity to a second one of said sealed switch units, and operating means for operating said logic module, said operating means including two separate means for applying a single unit of flux of said one polarity and one means for applying a single unit of flux of said opposite polarity to all three of said sealed switch units in common representing borrow, subtrahend and minuend information.

14. A logic module for signal translation comprising three sealed switch units each operable by the application of a single unit of flux, first biasing means for continuously applying a double unit of flux of a first polarity to a first one of said switch units, second biasing means for continuously applying a triple unit of flux of said one polarity to a second one of said sealed switch units, and operating means for operating said logic module, said operating means including three separate means for applying a single unit of flux of a polarity opposite to said one polarity to all three of said sealed switch units in common representing the signals to be translated.

15. The logic module set forth in claim 14 in which each of said sealed switch units includes a pair of contacts, which module also includes circuit means connecting all of said pairs of contacts in series.

16. A logic module comprising a plurality of pair of magnetic and electrically conductive elements, each pair of elements being movable into engagement in response to the application of a single flux unit thereto, biasing means including a bias winding means encircling at least one of said pairs of elements for continuously applying a whole number multiple of single flux units plus a half flux unit to said one pair of magnetic elements, and operating means for operating said pairs of magnetic elements in dependence on the input signals to provide an output signal, said operating means including means for applying different combinations of single flux units of selected polarities to all of said pairs of magnetic elements in common.

17. A circuit for determining the presence or absence of a given number M of inputs in a possible total number N of inputs comprising a plurality of sealed magnetic switches each operable between open and closed states by an effective applied magnetic field of either polarity and a given unit value, winding means for applying a common magnetic field of a given polarity to all of the sealed magnetic switches, input means controlled by the N inputs for selectively energizing the winding means to develope a magnetic field of X unit values where X is a number equal to the number of inputs actually present in the total possible number N of inputs, biasing means for selectively applying different individual biasing magnetic fields to a group of the sealed magnetic switches, said biasing magnetic fields being of a polarity opposite to the given polarity and of a magnitude greater than a single unit value, and circuit means connected to and responsive to the combination of open and closed states of the sealed switches to provide an indication when the number X is equal to the number M.

18. A decoding or code checking circuit for determining the presence of a number M of inputs in a total possible number N of inputs comprising first and second sealed magnetic switches of the type having magnetic and electrically conductive elements movable into engagement under the control of an applied magnetic field of a given unit value, circuit means for indicating the presence of M bits and including means connecting the first and second sealed magnetic switches in series, a number N of winding means for providing magnetic fields linking both of the first and second sealed switches, a plurality of N input means each connected to one of the winding means and each capable of energizing the connected winding means to provide a field of the given unit value, the resultant field applied to the first and second sealed switches by the plurality of winding means being substantially equal to X unit values where X is equal to the actual number of inputs present in the total possible number N, and biasing means for the first sealed switch means for applying a magnetic field to the first sealed switch means which is opposite in polarity to that provided by the plurality of winding means and which holds the first switch means in a closed circuit condition until X is greater in value than M and then permits the first sealed switch means to change to an open circuit condition, the second sealed switch means being operated to a closed circuit condition whenever X is at least as large as M.

19. A circuit for determining the presence or absence of a given number M of inputs in a possible total number N of inputs comprising a plurality of sealed magnetic switches each operable between open and closed states by an effective applied magnetic field of either polarity and a given unit value, winding means for applying a common magnetic field of a given polarity to all of the sealed magnetic switches, input means controlled by the N inputs for selectively energizing the winding means to develope a magnetic field of X unit values where X is a number equal to the number of inputs actually present in the total possible number N of inputs, circuit means including and controlled by the plurality of sealed magnetic switches for providing an indication that the number M of possible inputs is present, and biasing means for selectively applying different biasing magnetic fields to individual ones of the sealed magnetic switches which are of a polarity opposite to the given polarity and of a magnitude greater than a single unit value, the values of the biasing magnetic fields being such that the circuit means provides said indication when the number X is equal to the number M, one of the sealed magnetic switches being maintained in a given one state while the number X of actual inputs is less than the number M and being operated to an alternate state when the number X of actual inputs equals and exceeds the number M, the bias on a second of the sealed magnetic switches maintaining the second sealed switch in the alternate state when the number X of actual inputs is less than and equal to the number M and controlling this other switch to operate to the given state when the number X of actual inputs exceeds the number M.

20. The circuit set forth in claim 19 in which a third one of the sealed switches is provided with a biasing magnetic field normally maintaining the third switch in said alternate state and operable by the winding means to the said given state when the number X of actual inputs exceeds the number $M+1$.

21. A circuit for determining the presence or absence of a given number M of inputs in a possible total number N of input comprising a plurality of seald megnetic switches each operable between open circuit and closed circuit states by an effective applied magnetic field of either polarity and a given unit value, winding means for applying a common magnetic field of a given polarity to all of the sealed magnetic switches, input means controlled by the N inputs for selectively energizing the winding means to develope a magnetic field of X unit values where X is a number equal to the number of inputs actually present in the total possible number N of inputs, circuit means controlled by the plurality of sealed magnetic switches for providing an indication that the number M of possible inputs is present, said circuit means including means connecting at least first and second ones of the sealed magnetic switches in series, and biasing means for selectively applying different biasing magnetic fields to at least some of the sealed magnetic switches which are of a polarity to the given polarity and of a magnitude greater than the single unit value, the values of the biasing magnetic fields being such that the circuit means provides said indication when the number X is equal to the number M, the first one of the sealed magnetic switches being in an open state while the number X of actual inputs is less than the number M and being operated to closed state when the number X of actual inputs equals and exceeds the number M, the bias on the second of the sealed magnetic switches maintaining the second sealed switch in a closed state when the number X of actual inputs is less than and equal to the number M and controlling this other switch to operate to the open state when the number X of actual inputs exceeds the number M.

References Cited by the Examiner

UNITED STATES PATENTS

| | | | |
|---|---|---|---|
| 2,819,018 | 1/1958 | Yetter | 235—176 |
| 3,053,938 | 9/1962 | Nitsch | 179—27.54 |
| 3,086,085 | 8/1963 | Palm | 179—27.54 |

ROBERT C. BAILEY, *Primary Examiner.*

MALCOLM A. MORRISON, *Examiner.*

S. SIMON, M. J. SPIVAK, *Assistant Examiners.*